H. C. FELTHOUSEN.
Lens for Head-Lights.
No. 6,343. Reissued March 23, 1875.
Fig. II.
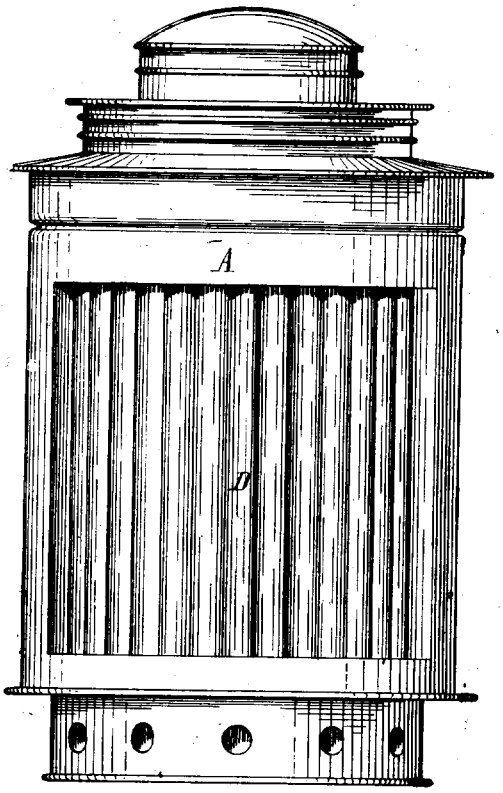
Fig. I.
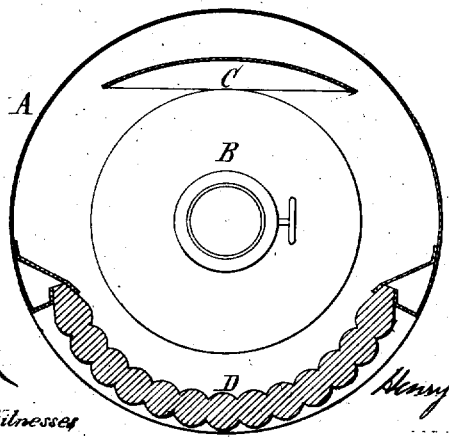
J. J. Bonner
Edward Wilhelm } Witnesses
Henry C. Felthousen Inventor
by Jas. Hyatt
Atty.

UNITED STATES PATENT OFFICE.

HENRY C. FELTHOUSEN, OF BUFFALO, NEW YORK.

IMPROVEMENT IN LENSES FOR HEAD-LIGHTS.

Specification forming part of Letters Patent No. 110,449, dated December 27, 1870; reissue No. 6,343, dated March 23, 1875; application filed June 15, 1874.

*To all whom it may concern:*

Be it known that I, HENRY C. FELTHOUSEN, of the city of Buffalo, in the county of Erie and State of New York, have invented an Improved Glass or Lens for Head-Lights, of which the following is a specification:

A ship's head-light, which is required to be visible at different ranges or distances, and from different directions, owing to the various positions a vessel assumes, should be constructed in such a manner as to equally illumine a considerable arc of the horizon and at various altitudes. With ordinary head-lights the rays are unequally distributed over the illuminated arc, the intensity of the light being so much greater at the center as to render the light visible at a considerable distance only when the observer is near the center of the illuminated arc.

A front glass for head-lights has heretofore been used, composed of a series of hollow tubes filled with a liquid, and arranged vertically side by side, in the form of an arc, corresponding to the curve of the front portion of the lantern wherein they are placed. Each of these tubes operates as a lens to collect the lateral rays to a focus, from whence they are more equally dispersed over the required arc of the horizon. Besides the labor and care required to properly fit and secure these tubes in place, and the liability of the tubes breaking from the expansion of the liquid therein, these glasses are defective from the fact that the rays, which strike the tubes near their line of junction, impinge at such an angle as to be reflected from the surface of the tubes, instead of being transmitted, whereby a considerable portion of the illuminating power of the light is wasted.

The object of my invention is to produce a glass that shall possess the advantages resulting from the use of a series of refracting convex surfaces, joined together at their edges, without the defects of the glass above described.

In the accompanying drawing, Figure 1 is a horizontal section of a lantern provided with my improved glass. Fig. 2 is a front elevation thereof.

Like letters of reference designate like parts in both of the figures.

A represents the case of the lantern of ordinary cylindrical form; B, the lamp; C, the reflector in the back; and D, the glass shown in the drawings, with both concave and convex surfaces constructed alike.

These two surfaces of the glass, the inner and outer, produce corresponding effects, the one augmenting or duplicating the effect produced by the other, except that a few of the rays strike certain portions of the inner surface at such an angle as to be reflected. Either surface will produce the required effect of refracting and dispersing the rays that pass through the central portion of the glass, so as to cause the light to be more equally distributed over the illuminated arc of the horizon.

Although in the foregoing description I may not have stated, with technical accuracy, the operation and effect of my improved glass, I have endeavored to explain as fully and exactly as I can the advantages which, from experiment, I have found it to possess.

What I claim as my invention is—

A front glass for head-lights, cast solid or in one piece, with convex ribs or collecting refracting-surfaces, substantially as and for the purposes herein shown and described.

HENRY C. FELTHOUSEN.

Witnesses:
J. J. BONNER
EDWARD WILHELM.